United States Patent
Shinozaki et al.

(10) Patent No.: US 7,424,590 B2
(45) Date of Patent: Sep. 9, 2008

(54) STORAGE SYSTEM AND DATA STORAGE METHOD

(75) Inventors: Toshihiko Shinozaki, Odawara (JP); Ryoji Furuhashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 179 days.

(21) Appl. No.: 11/450,260

(22) Filed: Jun. 12, 2006

(65) Prior Publication Data

US 2007/0245113 A1 Oct. 18, 2007

(30) Foreign Application Priority Data

Apr. 14, 2006 (JP) .............................. 2006-111926

(51) Int. Cl.
*G06F 12/00* (2006.01)
*G06F 13/00* (2006.01)

(52) U.S. Cl. ...................... 711/170; 711/100; 711/154; 711/162

(58) Field of Classification Search ................. 711/162, 711/170, 154, 161, 100; 714/6
See application file for complete search history.

(56) References Cited

U.S. PATENT DOCUMENTS

| 6,530,035 B1 * | 3/2003 | Bridge ........................... 714/6 |
| 6,725,328 B2 | 4/2004 | Kano et al. |
| 2007/0113004 A1 | 5/2007 | Sugimoto et al. |

FOREIGN PATENT DOCUMENTS

| JP | 2003-015915 | 7/2001 |
| JP | 2007-133822 | 11/2005 |

* cited by examiner

*Primary Examiner*—Tuan V. Thai
(74) *Attorney, Agent, or Firm*—Reed Smith LLP; Stanley P. Fisher, Esq.; Juan Carlos A. Marquez, Esq.

(57) ABSTRACT

The present invention proposes a highly reliable storage system and data storage method that can prevent a data copying failure from occurring. If the allocation of a dynamically variable storage area to a primary/secondary logical volume from within that provided by a primary/secondary pool volume results in a storage area shortage in a primary pool volume, the storage system allocates an additional storage area to that primary pool volume from within the storage area provided by a physical volume, and together with this allocation, also allocates an additional storage area to all secondary pool volumes related to that primary pool volume.

6 Claims, 12 Drawing Sheets

FIG.3

| PRIMARY LOGICAL VOLUME ID | SECONDARY LOGICAL VOLUME ID |
|---|---|
| a0 | b0 |
| a0 | c0 |
| a1 | c1 |
| b0 | d1 |

60A  60B  60

| LOGICAL VOLUME ID | POOL VOLUME ID |
|---|---|
| a0 | 10 |
| a1 | 10 |
| b0 | 11 |
| c0 | 12 |
| c1 | 12 |
| d0 | 50 |

FIG.5

| PHYSICAL VOLUME ID | POOL VOLUME ID |
|---|---|
| 100 | 10 |
| 101 | 10 |
| 102 | 10 |
| 110 | 11 |
| 111 | 11 |
| 112 | 11 |
| 120 | 12 |
| 121 | 12 |
| 122 | 12 |
| 500 | 50 |
| 501 | 50 |
| 502 | 50 |
| 600 | - |
| 601 | - |
| 602 | - |
| 603 | - |

FIG.7

| CAPACITY ADDITION TARGET PRIMARY POOL VOLUME ID | CONCURRENT CAPACITY ADDITION TARGET SECONDARY POOL VOLUME ID | REQUIRED NUMBER OF ADDITIONAL CAPACITY UNITS |
|---|---|---|
| 10 | 11 | 1 |
| 10 | 12 | 2 |
| 11 | 50 | 1 |

63A     63B     63C

63

STORAGE SYSTEM AND DATA STORAGE METHOD

CROSS-REFERENCES TO RELATED APPLICATIONS

This application relates to and claims priority from Japanese Patent Application No. 2006-111926, filed on Apr. 14, 2006, the entire disclosure of which is incorporated herein by reference.

BACKGROUND OF INVENTION

The present invention relates to a storage system and a data storage method. This invention is suited for use in a storage system using a storage apparatus provided with an AOU (Allocation On Use) function.

With the recent development of the information-oriented society, storage apparatuses providing a host apparatus with data storage areas have been receiving an increasing amount of data to be stored, and storage apparatus capacity has been expanded.

In order to expand storage capacity, this kind of storage apparatus generates a disk array configured based on RAID (Redundant Array of Independent Disks) from several physical disks, and collects a plurality of so generated physical storage resources to make a physical volume. Then, a storage area of a capacity requested by a host apparatus is taken out from the storage area provided by the so generated physical volumes to make a logical volume.

In connection with the above, technology called AOU function has been proposed where, instead of making a logical volume of a fixed capacity from physical volumes, a host apparatus is initially provided with a virtualized logical volume, and, in response to requests from the host apparatus, a dynamically variable storage area is allocated from within the storage area provided by the physical volumes (see JP Patent Publication No. 2003-015915 and others). This AOU technology can realize the dynamic capacity expansion of a virtualized logical volume.

Meanwhile, technology called copy function has also been disclosed where data stored in an area in a storage apparatus is replicated in another storage area within the same storage apparatus, or in another external storage apparatus (see JP Patent Publication No. 2005-328729 and others). With this copy function, if data stored in one area is lost, it is possible to utilize the same data stored in another area.

SUMMARY OF INVENTION

From the perspective of the expansion of storage capacity and the reliability of data storage in storage systems, storage systems can desirably execute processing involving both a storage capacity expansion function and a copy function in combination. One example of a combination of both functions is a logical volume copy function.

However, there has been a problem in making a backup copy using that logical volume copy function. That is, if a primary-side pool volume (hereinafter referred to as a "primary pool volume") providing a storage area to a primary-side logical volume (hereinafter referred to as a "primary logical volume"), which is to be a copy source for backup copying, runs out of capacity, this means that a secondary-side pool volume (hereinafter referred to as a "secondary pool volume") providing a storage area to a secondary-side logical volume (hereinafter referred to as a "secondary logical volume"), which is to be a copy destination, will also run out of capacity during backup copying, and if the capacity of the secondary pool volume cannot immediately be expanded, the backup copying will fail.

Note that the pool volumes used here mean volumes for holding and managing a part or the whole of the storage area existing in the storage system. Upon execution of the AOU function, a dynamically variable storage area is allocated to the primary and secondary logical volumes from within the storage area provided by the pool volume(s).

In consideration of the above, the present invention aims at proposing a storage system and data storage method that can prevent a data-copy failure from occurring and achieve high reliability.

In order to solve the above-described problems, the present invention provides a storage system that stores multiple copies of data by storing data written by a host apparatus to one or more primary logical volumes, both in the primary logical volumes and in one or more secondary logical volumes paired with the primary logical volumes, the storage system including: a first primary allocation unit for managing one or more first pool volumes, each being constituted from a portion of a storage area provided by corresponding storage devices and associated with one or more of the primary logical volumes, and allocating a dynamically variable storage area to the primary logical volumes from within the storage area managed as the associated first pool volume; a first secondary allocation unit for managing one or more second pool volumes, each being constituted from a portion of a storage area provided by corresponding storage devices and associated with one or more of the secondary logical volumes, and allocating a dynamically variable storage area to the secondary logical volumes from within the storage area managed as the associated second pool volume; a second primary allocation unit for allocating, in accordance with the status of storage area allocation to the primary logical volumes from within the storage area managed as the associated first pool volume, a dynamically variable storage area to the first pool volumes from within the storage area provided by the corresponding storage devices; and a second secondary allocation unit for allocating, together with the storage area allocation to the first pool volumes by the second primary allocation unit, a storage area to the second pool volumes from within the storage area provided by the corresponding storage devices.

Accordingly, in this storage system, by anticipating the occurrence of a capacity shortage in the second pool volume if the first pool volume runs short of capacity, it is possible to expand the capacity of the second pool volume together with the capacity expansion of the first pool volume.

This invention also provides a data storage method for storing multiple copies of data by storing data written by a host apparatus to one or more primary logical volumes, both in the logical volumes and in one or more secondary logical volumes paired with the primary logical volumes, the method including: a first step of managing one or more first pool volumes, each being constituted from a portion of a storage area provided by corresponding storage devices and associated with one or more of the primary logical volumes, and allocating a dynamically variable storage area to the primary logical volumes from within the storage area managed as the associated first pool volume, and also managing one or more second pool volumes, each being constituted from a portion of a storage area provided by corresponding storage devices and associated with one or more of the secondary logical volumes, and allocating a dynamically variable storage area to the secondary logical volumes from within the storage area managed as the associated second pool volume; and a second step of allocating, in accordance with the status of storage area allocation to the primary logical volumes from within the storage area managed as the associated first pool volume, a dynamically variable storage area to the first pool volumes from within the storage area provided by the corresponding storage devices, and also allocating, together with the storage area allocation to the first pool volumes, a storage area to the second pool volumes from within the storage area provided by the corresponding storage devices.

Accordingly, in this data storage method, by anticipating the occurrence of a capacity shortage in the second pool volume if the first pool volume runs short of capacity, it is possible to expand the capacity of the second pool volume together with the capacity expansion of the first pool volume.

According to the present invention, since it is possible to expand the capacity of the second pool volume together with the capacity expansion of the first pool volume, a highly-reliable storage system and data storage method that can prevent a data-copy failure from occurring can be realized.

BRIEF DESCRIPTION OF DRAWINGS

FIG. 3 is a schematic view of a backup operation status table;

FIG. 5 is a schematic view of a physical volume-pool volume table;

FIG. 7 is a schematic view of a pool volume capacity addition relationship table;

DETAILED DESCRIPTION

An embodiment of this invention is described below in detail with reference to the attached drawings.

(1) Storage system configuration according the embodiment

Figure 1:
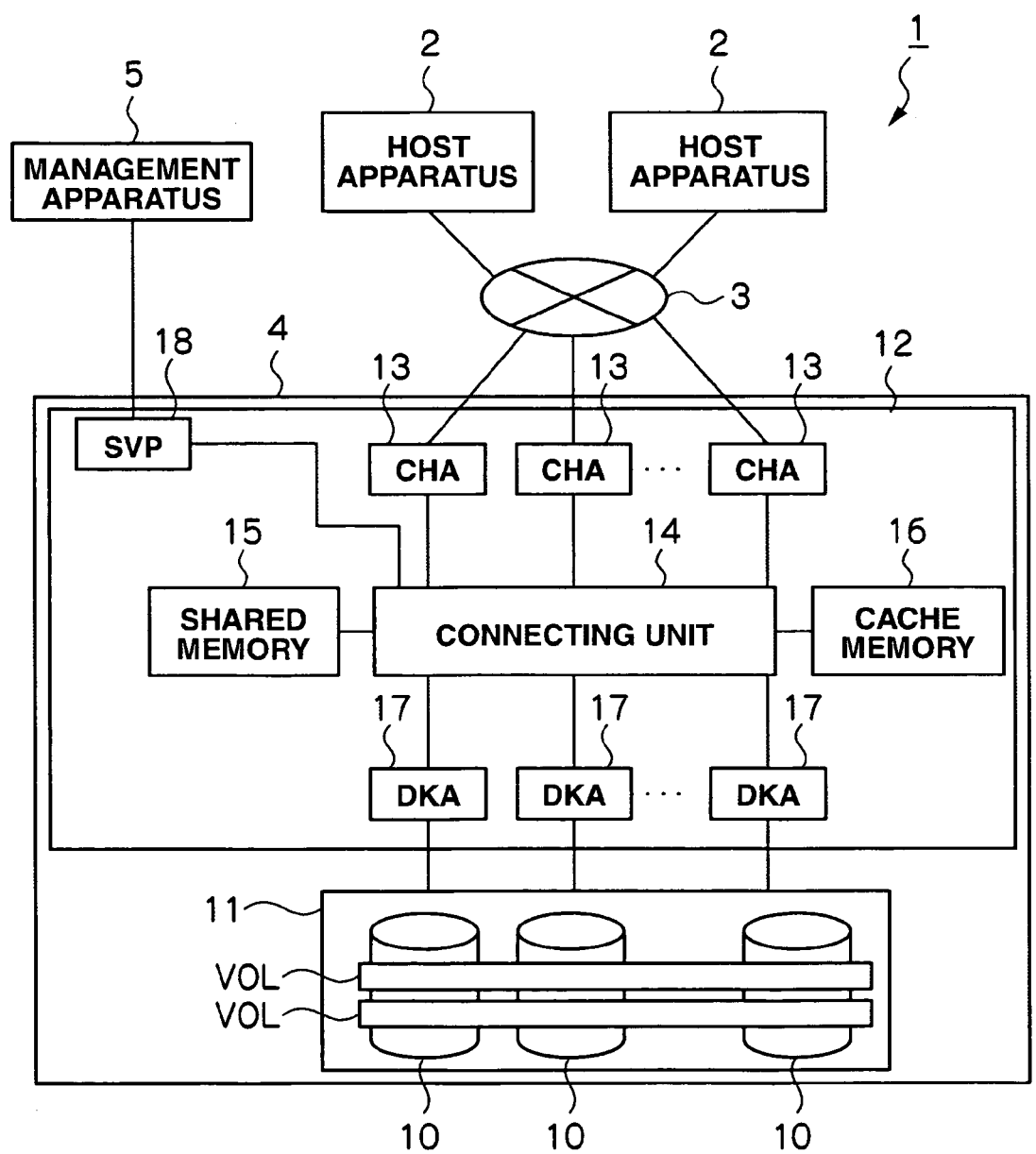
FIG. 1 is a block diagram showing the entire storage system configuration according to an embodiment of the invention.

In FIG. 1, a storage system 1 shows the entire system configuration according to this embodiment. The storage system 1 is constructed by connecting host apparatuses 2 to a storage apparatus 4 via a network 3, and also connecting the storage apparatus 4 to a management apparatus 5.

The host apparatuses 2 are computer devices equipped with a CPU (Central Processing Unit), memory and other information processing resources, and they are, for example, personal computers, workstations, mainframe computers, or similar. Each host apparatus 2 has data input devices, such as a keyboard, switch, pointing device, or microphone (not shown in the drawing), and data output devices, such as a monitor display or speaker (not shown in the drawing).

The network 3 is, for example, a SAN (Storage Area Network), LAN (Local Area Network), internet, public line, dedicated line, or similar. Communication between the host apparatuses 2 and the storage apparatus 4 via the network 3 is performed in accordance with, for example, Fibre Channel Protocol if the network 3 is a SAN, and TCP/IP (Transmission Control Protocol/Internet Protocol) if the network 3 is a LAN.

The storage apparatus 4 is configured to have a disk device unit 11 composed of a plurality of disk devices 10, and a controller 12 for controlling each disk device 10.

Examples of the disk devices 10 include expensive disk drives, such as SCSI (Small Computer System Interface) disks, and inexpensive disk drives, such as SATA (Serial AT Attachment) disks and optical disk drives. In a physical storage area provided by one or more disk devices 10, one or more logically defined volumes (hereinafter referred to as logical volume(s)) VOL are established. Data from the host apparatuses 2 is read from/written to the logical volume(s) VOL in blocks of a predetermined size.

Each logical volume VOL is given its own unique identifier (LUN: Logical Unit Number). In this embodiment, an LUN, together with the unique number given to each logical block (LBA: Logical Block Address), constitutes an address, and user's data input/output is performed designating a specific address of that type.

The controller 12 is configured to have a plurality of channel adapters 13, a connecting unit 14, shared memory 15, cache memory 16, and a plurality of disk adapters 17.

Each channel adapter 13 is configured as a microcomputer system including a microprocessor, memory 133, and a communication interface, etc., and has a port 131 for connection with the network 3. Each channel adapter 13 interprets various commands sent from the host apparatuses 2 and executes the necessary processing. The port 131 of each channel adapter 13 is assigned a network address (for example, an IP address or WWN) for identifying themselves, and as a result each channel adapter 13 can individually behave as NAS (Network Attached Storage). The channel adapters 13 also store various tables 60 to 63 and various programs 64 to 68, which are explained later. Each channel adapter 13 is connected to the connecting unit 14 via their internal bus adapter 132.

The connecting unit 14 is connected to each channel adapter 13, as well as the shared memory 15, cache memory 16 and each disk adapter 17. Data and commands are transmitted via the connecting unit 14 to and from each channel adapter 13, shared memory 15, cache memory 16 and each disk adapter 17. The connecting unit 14 is constructed from, for example, a switch, such as an ultra-high-speed cross-bus switch that executes data transmission by high-speed switching; a bus; or similar.

The shared memory 15 is storage memory shared by the channel adapters 13 and the disk adapters 17. The shared memory 15 is mainly used to store the system configuration information and various control programs, which are read out from system volumes upon the storage apparatus 2 being powered on, and commands sent from the host apparatuses 2.

The cache memory 16 is also storage memory shared by the channel adapters 13 and the disk adapters 17. The cache memory 16 is mainly used to temporarily store user data to be input to/output from the storage apparatus 4.

Each disk adapter 17 is configured as a microcomputer system including a microprocessor, memory, etc., and functions as an interface for performing protocol control during communication with each disk device 10. The disk adapters 17 are connected to their corresponding disk devices 10 via, for example, a Fibre Channel cable, and transmit data to/from those disk devices 10 in accordance with Fibre Channel Protocol.

A service processor 18 is a computer device operated to maintain or manage the storage apparatus 4, and is, for example, a notebook-type personal computer. The service processor 18 is connected to the host apparatuses 2 via the network 3, so it can receive data and commands from the host apparatuses 2. The service processor 18 can monitor the storage apparatus 4 for the occurrence of any failure and show the monitoring result on a display (not shown in the drawing).

Like the host apparatuses 2, the management apparatus 5 is a computer device equipped with a CPU (Central Processing Unit), memory and other information processing resources, and it is, for example, personal computers, workstations, portable terminal devices, or similar. The management apparatus 5 includes: a display device for displaying various kinds of information and a GUI (Graphical User Interface) for the various settings for the storage apparatus 4; and an input device, such as a keyboard or mouse, for a system administrator to input various commands and setting information. The management apparatus 5 executes various kinds of processing in accordance with various commands input using the input device.

(2) The copy function and AOU function in the storage system according to the embodiment Next, a copy function and an AOU function, which the storage apparatus 4 in the storage system 1 has, will be explained.

The storage system 1 is provided with: a copy function for replicating data written by a host apparatus 2 to a primary logical volume PVOL in the storage apparatus 4 in a secondary logical volume SVOL, which is also in the storage apparatus 4 and is paired with the above primary logical volume PVOL; and an AOU function for allocating, in response to a request from a host apparatus 2, a dynamically variable storage area to a virtualized primary logical volume PVOL and secondary logical volume SVOL from within the storage area provided by a primary pool volume PLVOL and secondary pool volume SLVOL.

Here, the copy function is one of the functions that storage apparatuses have, and it includes a remote copy function and a local copy function. The remote copy function means replicating data written to a primary logical volume in a storage apparatus, in a secondary logical volume established in another storage apparatus at a remote location, thereby storing multiple copies of the data. Meanwhile, the local copy function means replicating (making a backup copy of) data written to a primary logical volume in a storage apparatus, in a secondary logical volume established in the same storage apparatus, thereby storing multiple copies of the data. The below explanation will be made assuming that the storage system has the local copy function.

Meanwhile, the AOU function means allocating a dynamically variable storage area to a logical volume in a storage apparatus from within the storage area provided by the corresponding pool volume, thereby automatically expanding the capacity of a primary/secondary logical volume.

During actual operation, a CPU 130 in the storage apparatus 4 manages the storage area provided by the storage devices existing in its own storage apparatus and the storage area provided by an external storage apparatus (not shown in the drawing), as a physical volume BVOL, and also manages a portion of the storage area provided by that physical volume BVOL as a primary pool. volume PLVOL/secondary pool volume SLVOL. Also, the CPU 130 establishes a primary logical volume PVOL as a virtualized logical volume and provides it to a host apparatus 2, and also establishes a secondary logical volume SVOL as another virtualized logical volume that is paired with the above primary logical volume PVOL.

When receiving a data write request specifying a certain primary logical volume PVOL from any host apparatus 2 together with the target write data, the CPU 130 in the storage apparatus 4 allocates, as necessary, a part of the storage area provided by a primary pool volume PLVOL to the specified primary logical volume PVOL, and stores the target write data in the storage area allocated to that specified primary logical volume PVOL from within the storage area provided by the primary pool volume PLVOL.

Also, the CPU 130 copies the data that has been stored in the primary pool volume PLVOL to a secondary logical volume SVOL. More specifically, the CPU 130 allocates, as necessary, a part of the storage area provided by a secondary pool volume SLVOL to a secondary logical volume SVOL, and replicates the target write data in the storage area allocated to the secondary logical volume SVOL from within the storage area provided by the secondary pool volume SLVOL.

(3) The Concurrent Pool Expansion Function in the Storage System According to the Embodiment Next, a concurrent pool expansion function, which is installed in the storage apparatus 4 in the storage system 1, will be explained.

The storage system 1 is provided with a concurrent pool expansion function where, if the allocation of a dynamically variable storage area to a primary logical volume PVOL/ secondary logical volume SVOL from within the storage area provided by a primary pool volume PLVOL/secondary pool volume SLVOL in accordance with the above-explained AOU function results in a shortage of the storage area in a primary pool volume PLVOL, an additional storage area is allocated to that primary pool volume PLVOL from within the storage area provided by the physical volume BVOL, and together with that allocation, an additional storage area is also allocated from within the storage area provided by the physical volume BVOL to all of the secondary pool volumes SLVOL that are associated with or related to the above primary pool volume PLVOL.

As the means used for the above function, each channel adapter 13 in the storage apparatus 4 has a backup operation status table 60, logical volume-pool volume table 61, physical volume-pool volume table 62 and pool volume capacity addition relationship table 63, all stored in its memory 133.

The backup operation status table 60 is a table for managing the status regarding which primary logical volume PVOL is used to store target write data from the host apparatuses 2, and which logical volume is operated as the secondary logical volume SVOL paired, for backup copying, with that primary logical volume PVOL storing the target data.

As shown in FIG. 3, the backup operation status table 60 is composed of a "primary logical volume ID" field 60A and "secondary logical volume ID" field 60B.

The "primary logical volume ID" field 60A stores the volume ID, i.e., the identification information for a primary logical volume PVOL, which is to be a copy source for data copying. The "secondary logical volume ID" field 60B stores the volume ID of a secondary logical volume SVOL, which is paired with the relevant primary logical volume PVOL as a volume to be a copy destination for data copying. For example, FIG. 3 shows that the primary logical volume PVOL with a volume ID of "a0" is paired with the secondary logical volume SVOL with a volume ID of "b0." With this backup operation status table 60, it is possible to manage which primary logical volume PVOL is paired with which secondary logical volume SVOL.

Figure 4:
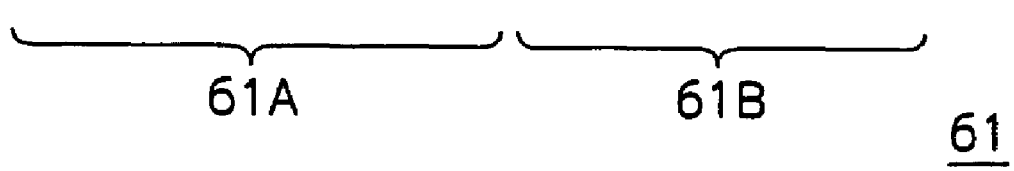
FIG. 4 is a schematic view of a logical volume-pool volume table.

The logical volume-pool volume table 61 is a table for managing the correlation between the logical volumes and the pool volumes, including which logical volume is associated with which pool volume. As shown in FIG. 4, the logical volume-pool volume table 61 is composed of a "logical volume ID" field 61A and "pool volume ID" field 61B.

Figure 6:
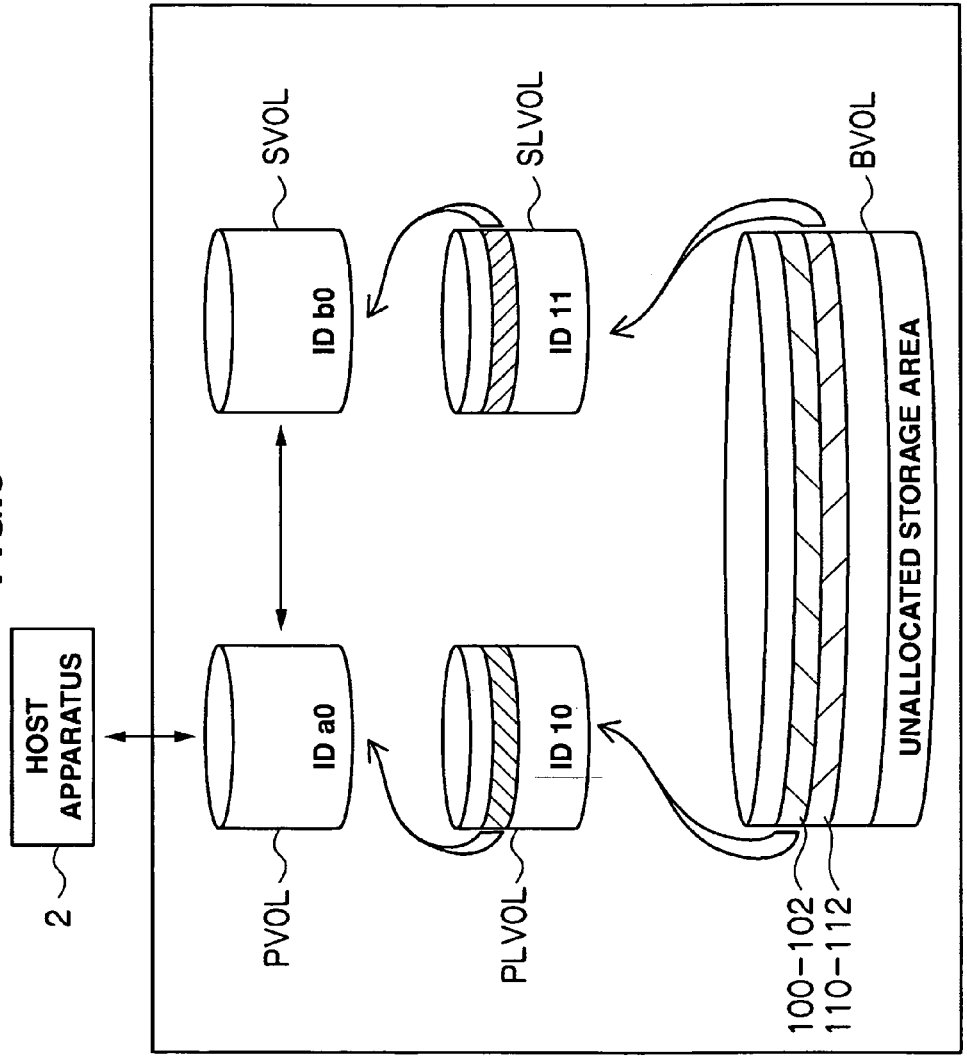
FIG. 6 is a schematic view for explaining the AOU function.

In the above fields, the "logical volume ID" field 61A stores the volume ID of each primary logical volume PVOL/ secondary logical volume SVOL existing in the storage apparatus 4. The "pool volume ID" field 61B stores the pool volume ID of the primary pool volume PLVOL/secondary pool volume SLVOL that is associated with the relevant logical volume. In this embodiment, FIG. 6 shows, for example, that the primary logical volume PVOL with a logical volume ID of "a0" is associated with the primary pool volume PLVOL with a pool volume ID of "10." In other words, a dynamically variable storage area is allocated to the primary logical volume PVOL with the volume ID "a0" from within the storage area provided by the primary pool volume PLVOL with the pool volume ID "10."

The physical volume-pool volume table 62 is a table for managing how each portion of the physical volume, which is constituted by the storage area provided by each storage device, is provided to a pool volume, and this table is composed of a "physical volume ID" field 62A and "pool volume ID" field 62B.

The "physical volume ID" field 62A stores a physical volume ID in the physical volume BVOL. The "pool volume ID" field 62B stores the pool volume ID of a primary pool volume PLVOL/secondary pool volume SLVOL. In this embodiment, as can be seen from FIGS. 5 and 6, for example, the storage area corresponding to physical volume IDs of "100" to "102" in the physical volume BVOL is provided to the primary pool volume PLVOL with a pool volume ID of "10."

Also, in FIG. 5, there is no pool volume ID provided with the storage area corresponding to a physical volume ID of "600" in the physical volume BVOL. In other words, the storage area corresponding to the physical volume ID "600" in the physical volume BVOL is an unallocated area.

The pool volume capacity addition relationship table 63 is a table for managing the status of the dynamic capacity expansion, which should be performed for all related secondary pool volumes SLVOL, together with the dynamic capacity expansion of a primary pool volume PLVOL.

As shown in FIG. 7, the pool volume capacity addition relationship table 63 is composed of a "capacity addition target primary pool volume ID" field 63A, "concurrent capacity addition target secondary pool volume ID" field 63B, and "required number of additional capacity units" field 63C.

The "capacity addition target primary pool volume ID" field 63A stores the pool volume ID, i.e., the identification information for a primary pool volume PLVOL, which is to be a copy source for data copying. The "concurrent capacity addition target secondary pool volume ID" field 63B stores the pool volume ID, i.e., the identification information for a secondary pool volume SLVOL, which is to be a copy destination for data copying. In this table, the pool volume ID, i.e., the identification information for a secondary pool volume SLVOL, is directly or indirectly associated with the pool volume ID, i.e., the identification information for a primary pool volume PLVOL. The "required number of additional capacity units" field 63C stores information about the number of copies to be made (i.e., the number of areas to be allocated) in the concurrent capacity addition target secondary pool volume SLVOL.

In this embodiment, FIG. 7 shows, for example, that the primary pool volume PLVOL with a pool volume ID of "10" is directly associated, as a "capacity addition target primary pool volume," with a secondary pool volume SLVOL with a pool volume ID of "11" as a "concurrent capacity addition target secondary pool volume." FIG. 7 also shows that the number of copies to be made (i.e., the number of areas to be allocated) in that concurrent capacity addition target secondary pool volume SLVOL with a pool volume ID of "11" is "1."

Likewise, FIG. 7 shows that the above primary pool volume PLVOL with a pool volume ID of "10" is directly associated, as a "capacity addition target primary pool volume," with another secondary pool volume SLVOL with a pool volume ID of "12" as a "concurrent capacity addition target secondary pool volume." FIG. 7 also shows that the number of copies to be made (i.e., the number of areas to be allocated) in that concurrent capacity addition target secondary pool volume SLVOL with a pool volume ID of "12" is "2."

FIG. 7 also shows that another secondary pool volume SLVOL with a pool volume ID of "50" is related, as a "concurrent capacity addition target secondary pool volume," to the above primary pool volume PLVOL with a pool volume ID of "10", as a "capacity addition target primary pool volume," via the secondary pool volume SLVOL having a pool volume ID of "11" and directly associated with that primary pool volume. FIG. 7 also shows that the number of copies to be made (i.e., the number of areas to be allocated) in that concurrent capacity addition target secondary pool volume SLVOL with a pool volume ID of "50" is "1."

Accordingly, dynamic capacity expansion is performed for not only all secondary pool volumes SLVOL directly associated with a primary pool volume PLVOL, but also for any secondary pool volume SLVOL that is related to the primary pool volume PLVOL via any of the directly associated secondary pool volumes SLVOL, and thus, it is possible to dynamically expand the capacity of all related pool volumes, from the second generation volume to the third or further generation volume.

(4) Processing executed by the CPU in the storage apparatus based on the concurrent pool expansion function (4-1) Data Write Processing Next, the content of the processes run by the CPU 130 in the storage apparatus 4 with regard to the concurrent pool expansion function installed in the storage apparatus 4 according to the embodiment will be explained. First of all, the procedure executed by the CPU 130 in the storage apparatus 4 for writing data to a logical volume constituted by storage devices will be explained.

Figure 8:
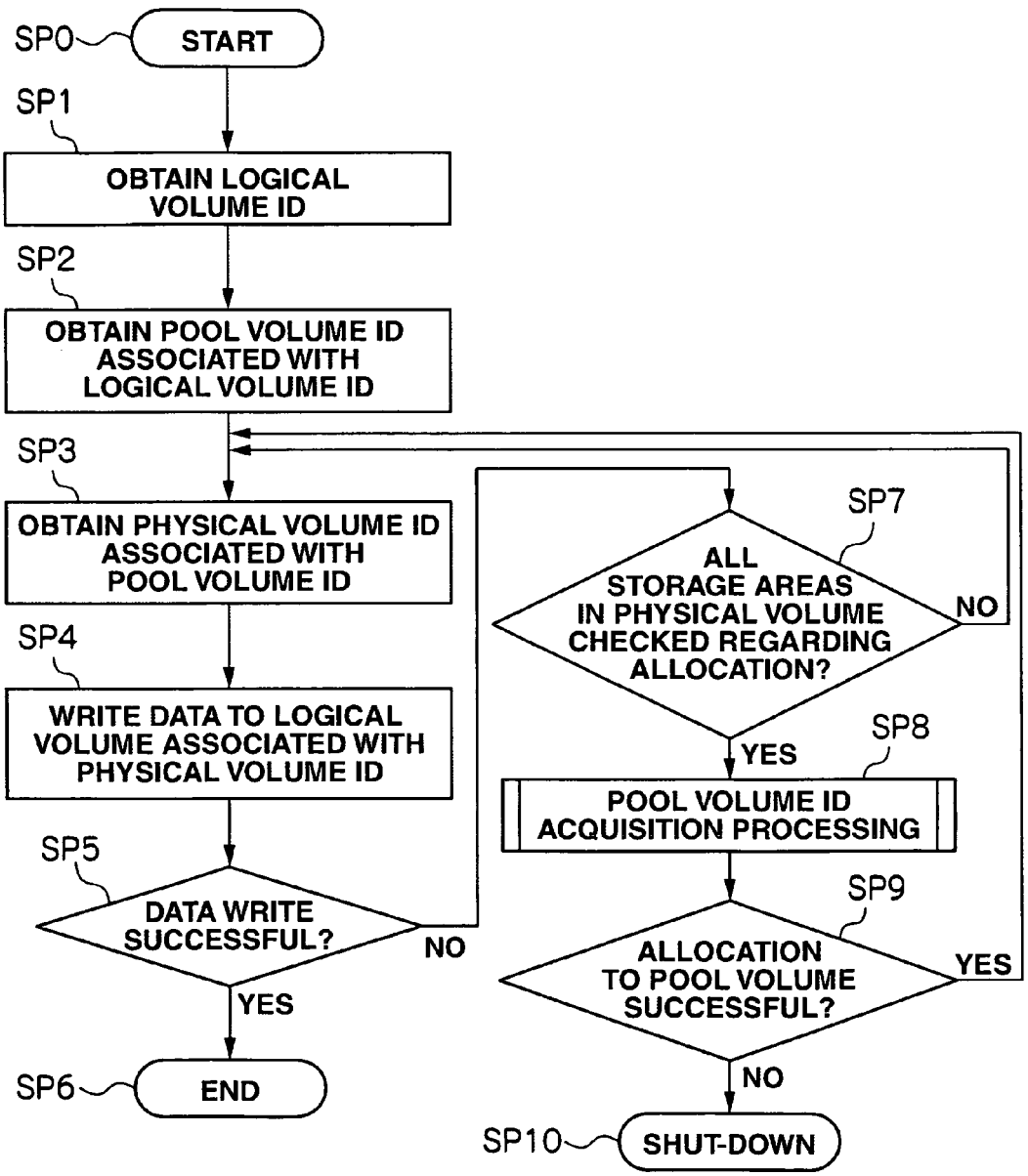
FIG. 8 is a flowchart showing the content of the processing executed by a CPU in a storage apparatus for data write processing.

FIG. 8 is a flowchart describing the content of the processing executed by the CPU 130 in the storage apparatus 4 for data write processing. In this processing, the CPU 130 executes data write processing in accordance with the data write program 64 stored in the memory 133 in the storage apparatus 4, and writes data to a logical volume.

More specifically, when a write request is issued by the host apparatus 2, the CPU 130 starts the data write processing (SP0). The CPU 130 first obtains the volume ID of the logical volume to which the target write data is to be written (SP1).

The CPU 130 then searches the logical volume-pool volume table 61 to obtain the pool volume ID associated with the obtained logical volume ID (SP2).

Next, the CPU 130 searches the physical volume-pool volume table 62 to obtain a physical volume ID associated with the obtained pool volume ID (SP3).

The CPU 130 then writes data to the storage area in the logical volume PVOL associated with the obtained physical volume ID (SP4), and checks whether the data write has been completed successfully or not (SP5). If the data write has been completed successfully (SP5: YES), the data write program processing ends normally (SP6).

Meanwhile, if the data write fails (SP5: NO), the CPU 130 then checks whether the storage areas in the physical volume BVOL have been checked regarding whether they are allocated to any pool volume PLVOL/SLVOL (SP7).

If some storage areas in the physical volume BVOL have not yet been checked (SP7: NO), the CPU 130 returns to SP3. Meanwhile, if the storage areas in the physical volume BVOL have been checked (SP7: YES), the CPU 130 executes pool volume ID acquisition processing (SP8). Details of that processing will be explained later referring to the flowchart shown in FIG. 9.

After acquiring new record(s) for pool volume ID(s), the CPU 130 then checks whether a storage area has been allocated to the pool volume PLVOL/SLVOL having the acquired pool volume ID from within the unallocated storage area of the physical volume BVOL (SP9).

If the CPU 130 judges that a storage area has been allocated from within the storage area provided by the physical volume BVOL (SP9: YES), the CPU 130 returns to SP3. Meanwhile, if the CPU 130 judges that some pool volumes PLVOL/SLVOL have not been allocated a storage area from within the storage area provided by the physical volume BVOL (SP9: NO), because there is no unallocated storage area remaining in the physical volume BVOL, the CPU 130 shuts down the data write processing (SP10).

(4-2) Pool volume ID acquisition processing

Next, another procedure executed by the CPU 130 in the storage apparatus 4 will be explained, the procedure being executed if the CPU 130 has checked the storage areas in the physical volume BVOL regarding whether they are allocated to any pool volume PLVOL/SLVOL, and has found it necessary to acquire a new record for a pool volume ID.

Figure 9:
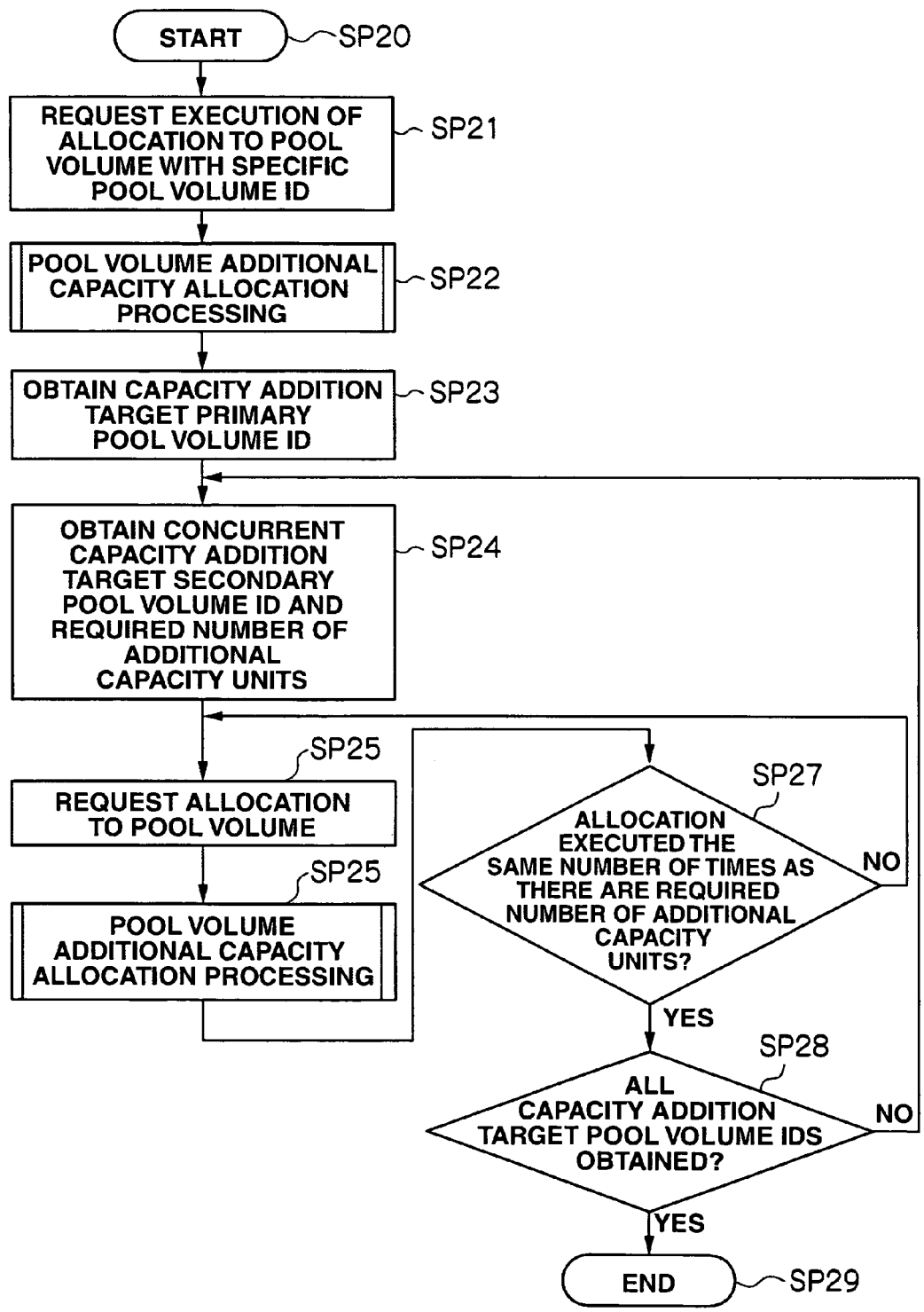
FIG. 9 is a flowchart showing the content of the processing executed by a CPU in a storage apparatus for pool volume ID acquisition processing.

FIG. 9 is a flowchart describing the content of the processing executed by the CPU 130 in the storage apparatus 4 for the pool volume ID acquisition processing. In this processing, the CPU 130 executes the pool volume ID acquisition processing in accordance with the pool volume ID acquisition program 65 stored in the memory 133 in the storage apparatus 4, and acquires the pool volume ID of a primary pool volume PLVOL or secondary pool volume SLVOL, to which a storage area needs to be allocated from within the unallocated storage area provided by the physical volume BVOL.

More specifically, if the CPU 130 judges at SP7 in FIG. 8 that the storage areas in the physical volume BVOL have been checked regarding whether they are allocated to any primary/secondary pool volume PLVOL/SLVOL, the CPU 130 starts the pool volume ID acquisition processing (SP20). The CPU 130 first requests the execution of the processing for allocating, from within the unallocated storage area provided by the physical volume BVOL, a storage area to the primary pool volume PLVOL/secondary pool volume SLVOL having a specific pool volume ID (SP21).

The CPU 130 then executes the pool volume additional capacity allocation processing (SP22). The allocation processing executed here is for the primary pool volume PLVOL. Details of this processing will be explained later with reference to the flowchart shown in FIG. 10.

When a portion of the storage area provided by the physical volume BVOL is allocated to the primary pool volume PLVOL as capacity, the CPU 130 recognizes the specific pool volume ID of that primary pool volume PLVOL as a capacity addition target primary pool volume ID (SP23).

Then, the CPU 130 refers to the pool volume capacity addition relationship table 63, and obtains a concurrent capacity addition target secondary pool volume ID that is associated with the above-recognized capacity addition target primary pool volume ID, and the corresponding required number of additional capacity units (SP24).

The CPU 130 next requests the allocation of a storage area to the secondary pool volume SLVOL, designating the above-obtained concurrent capacity addition target secondary pool volume ID as a pool volume ID for which allocation is requested (SP25).

The CPU 130 then executes the pool volume additional capacity allocation processing (S26). The allocation processing executed here is for the secondary pool volume SLVOL. Details of this processing will be explained later with reference to the flowchart shown in FIG. 10.

When a portion of the storage area provided by the physical volume BVOL is allocated to the secondary pool volume SLVOL as capacity, the CPU 130 checks whether the allocation of a storage area to the secondary pool volume SLVOL has been requested the same number of times as the exact value of the above-obtained required number of additional capacity units (SP27). If the CPU 130 has not yet requested allocation the same number of times as the exact value of the required number of additional capacity units (SP27: NO), the CPU 130 returns to SP25. Meanwhile, if the CPU 130 has requested allocation the same number of times as the exact value of the required number of additional capacity units (SP27: YES), the CPU 130 goes to the next step.

More specifically, the CPU 130 refers to all capacity addition target primary pool volume IDs and concurrent capacity addition target secondary pool volume IDs recorded in the pool volume capacity addition relationship table 63, and checks whether it has obtained the pool volume ID for all pool volumes PLVOL/SLVOL to which additional capacity should be allocated (SP28).

If the CPU 130 has not yet obtained some pool volume IDs for which additional capacity should be allocated (SP28: NO), the CPU 130 returns to SP24. If the CPU 130 has obtained all pool volume IDs for which additional capacity should be allocated (SP28: YES), the CPU 130 ends the pool volume ID acquisition processing (SP29).

After that, the CPU 130 goes to SP9 in FIG. 8, and proceeds to the above data write processing.

(4-3) Pool volume additional capacity allocation processing

Next, another procedure executed by the CPU 130 in the storage apparatus 4 will be explained, the procedure being executed to provide a storage area, from within the unallocated storage area provided by the physical volume BVOL, to the primary pool volume PLVOL/secondary pool volume SLVOL having a specific pool volume ID, thereby allocating additional capacity to the primary pool volume PLVOL/secondary pool volume SLVOL.

Figure 10:
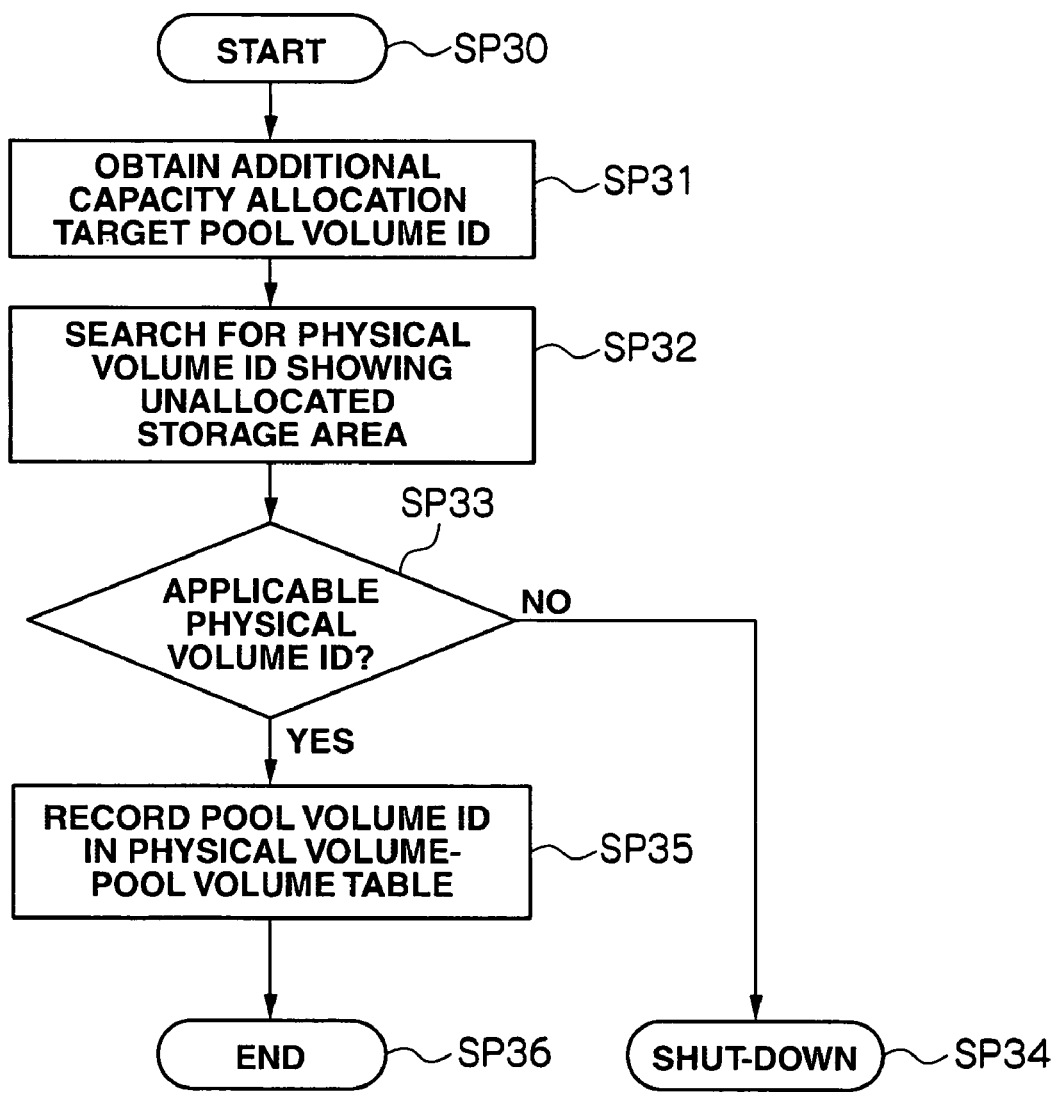
FIG. 10 is a flowchart showing the content of the processing executed by a CPU in a storage apparatus for pool volume additional capacity allocation processing.

FIG. 10 is a flowchart describing the content of the processing executed by the CPU 130 in the storage apparatus 4 for the pool volume additional capacity allocation processing. In this processing, the CPU 130 executes the pool volume additional capacity allocation processing in accordance with the pool volume additional capacity allocation program 66 stored in the memory 133 in the storage apparatus 4, and allocates additional capacity to all the primary pool volume PLVOL/secondary pool volumes SLVOL to which a storage area needs to be allocated from within the unallocated storage area provided by the physical volume BVOL.

When a storage area needs to be allocated, from within the unallocated storage area provided by the physical volume, to the primary pool volume PLVOL/secondary pool volume SLVOL having a specific pool volume ID, the CPU 130 starts the additional capacity allocation processing for the primary pool volume—the capacity addition target primary pool volume (SP30)—and first obtains the pool volume ID of the additional capacity allocation target primary pool volume (SP31).

The CPU 130 then references the physical volume-pool volume table 62, searches for a physical volume ID showing an unallocated storage area in the physical volume BVOL (SP32), and then judges whether there is any applicable physical volume ID (SP33). If it is judged that there is no such physical volume ID (SP33: NO), which means that the physical volume BVOL has no unallocated storage area remaining, the CPU 130 shuts down the pool volume additional capacity allocation processing (SP34). Meanwhile, if there is an applicable physical volume ID (SP33: YES), the CPU 130 makes a new record in the physical volume-pool volume table 62 associating the primary pool volume ID with the obtained physical volume ID (SP35). The CPU 130 then ends the pool volume additional capacity allocation processing (SP36).

After that, the CPU 130 goes to SP23 in FIG. 9, and proceeds to the execution of the above-described pool volume ID acquisition processing.

The additional capacity allocation processing for the concurrent capacity addition target secondary pool volume is executed in the same way as the above-explained additional capacity allocation processing for the capacity addition target primary pool volume. The CPU 130 then goes to SP27 in FIG. 9, and proceeds to the execution of the above-described pool volume ID acquisition processing.

Accordingly, in the storage system 1, when write data sent from the host apparatus 2 is written to the relevant primary logical volume PVOL, the CPU 130 executes the above-explained data write processing; pool volume ID acquisition processing; and pool volume additional capacity allocation processing, whereby additional capacity can be allocated to all the related secondary pool volumes SLVOL together with the allocation of additional capacity to the primary pool volume PLVOL.

(4-4) Pool volume capacity addition relationship table generation processing

Next, another procedure executed by the CPU 130 in the storage apparatus 4 will be explained, the procedure being executed, every time a pool volume ID is acquired, for generating or updating a pool volume capacity addition relationship table 63 stored in the memory 133 in the storage apparatus 4.

Figure 11:
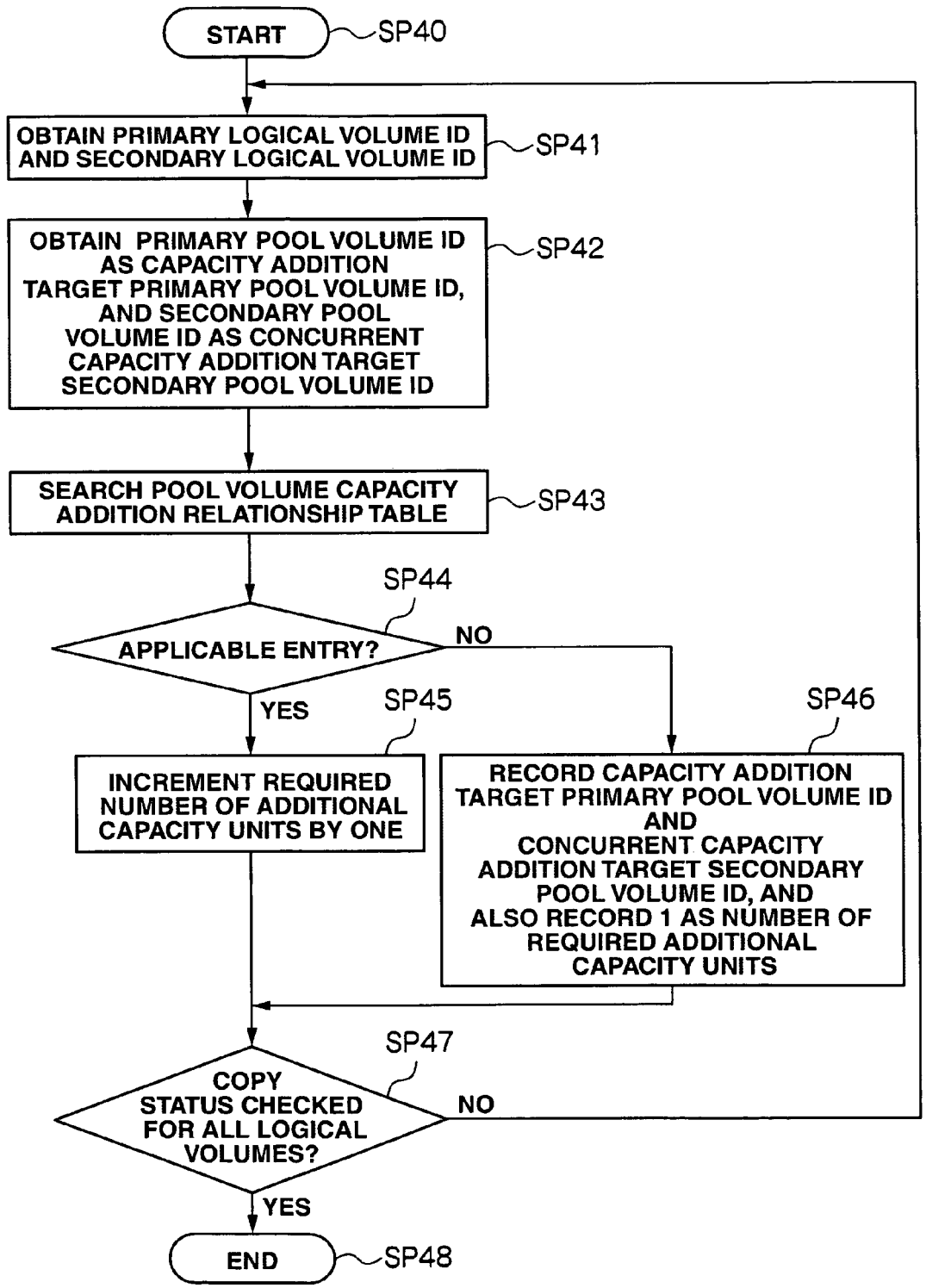
FIG. 11 is a flowchart showing the content of the processing executed by a CPU in a storage apparatus for pool volume capacity addition relationship table generation processing.

FIG. 11 is a flowchart describing the content of the processing executed by the CPU 130 in the storage apparatus 4 for the pool volume capacity addition relationship table generation processing. In this processing, the CPU 130 executes the pool volume capacity addition relationship table generation processing, in accordance with the pool volume capacity addition relationship table generation program 67 stored in the memory 133 in the storage apparatus 4. The CPU 130 checks the status of copying, such as backup copying, between the primary pool volumes PLVOL and the secondary pool volumes SLVOL, and if a primary pool volume PLVOL has not been associated with its corresponding secondary pool volume SLVOL, the CPU 130 generates, or updates, a pool volume capacity addition relationship table 63, by recording the primary pool volume ID and secondary pool volume ID as well as the required number of additional capacity units, which corresponds to the number of copies required to be made in that secondary pool volume, and associating the primary pool volume PLVOL with the corresponding secondary pool volume SLVOL.

The CPU 130 first checks the status of copying, such as backup copying, between the primary pool volumes PLVOL and the secondary pool volumes SLVOL, and if a primary pool volume PLVOL has not been associated with its corresponding secondary pool volume SLVOL, the CPU 130 starts the pool volume capacity addition relationship table generation processing (SP40). The CPU 130 first obtains the respective volume IDs of a primary logical volume PVOL and its corresponding secondary logical volume SVOL from the backup operation status table 60 (SP41).

The CPU 130 then references the logical volume-pool volume table 61 and obtains the pool volume ID of the primary pool volume PLVOL associated with the above-obtained volume ID of the primary logical volume PVOL, and also obtains the pool volume ID of the secondary pool volume SLVOL associated with the above-obtained volume ID of the secondary logical volume SVOL (SP42).

The CPU 130 next refers to the pool volume capacity addition relationship table 63, checks whether the above-obtained primary pool volume ID and secondary pool volume ID are associated in that table as a primary pool volume PLVOL and its corresponding secondary pool volume SLVOL (SP43), and judges whether there is an applicable entry (SP44).

If there is an applicable entry in the pool volume capacity addition relationship table 63 (SP44: YES), the CPU 130 increments the present value stored in the "required number of additional capacity units" field by one (SP45). Meanwhile, if the above check shows there is no applicable entry (SP44: NO), the CPU 130 records the concerned primary pool volume ID and secondary pool volume ID in the "capacity addition target primary pool volume ID" field and the "concurrent capacity addition target secondary pool volume ID" field respectively, and also records "1" in the "required number of additional capacity units" field (SP46).

After that, the CPU 130 judges whether the status of copying has been checked for all logical volumes PVOL/SVOL (SP47). If the status of copying has not yet been checked for some of the logical volumes PVOL/SVOL (SP47: NO), the CPU 130 returns to SP 41. Meanwhile, if the status of copying has been checked for all logical volumes PVOL/SVOL (SP47: YES), the CPU 130 ends the pool volume capacity addition relationship table generation processing (SP48).

(4-5) Pool volume addition processing

Next, another procedure executed by the CPU 130 in the storage apparatus 4 will be explained, the procedure being executed for a user to allocate a storage area to a new pool volume PLVOL/SLVOL from within the storage area provided by the physical volume BVOL, if a new hard disk drive or a new external storage apparatus (not shown in the drawing) has been added to the storage system 1 in this embodiment.

Figure 12:
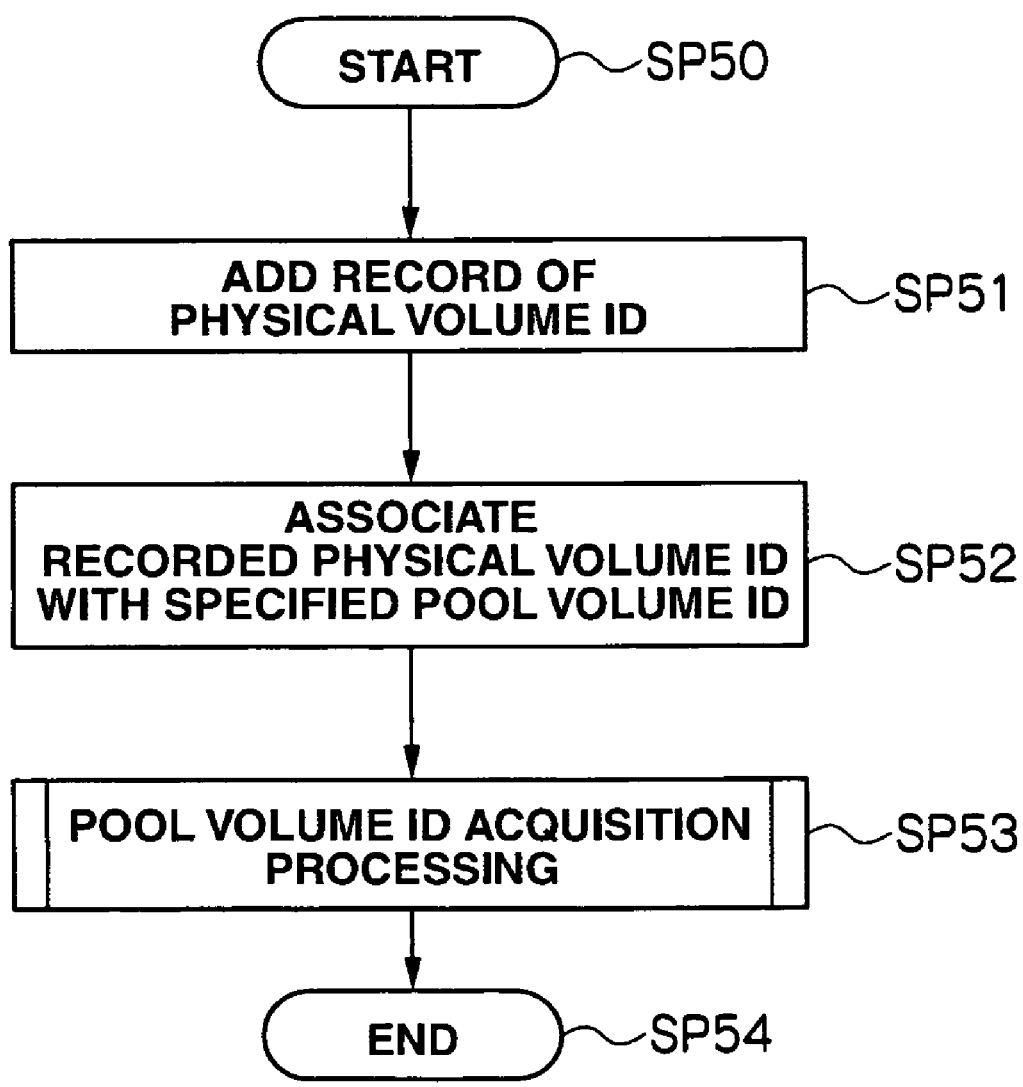
FIG. 12 is a flowchart showing the content of the processing executed by a CPU in a storage apparatus for pool volume addition processing.

FIG. 12 is a flowchart describing the content of the processing executed by the CPU 130 in the storage apparatus 4 for the pool volume addition processing. In this processing, the CPU 130 executes the processing for adding a primary pool volume PLVOL or secondary pool volume SLVOL in accordance with the pool volume addition program 68 stored in the memory 133 in the storage apparatus 4.

During actual operation, when a new disk or new external storage apparatus is added, the CPU 130 starts the pool volume addition processing for a user to allocate a storage area to a new primary pool volume PLVOL or secondary pool volume SLVOL from within the storage area provided by the physical volume BVOL (SP50). The CPU 130 first adds a record for a physical volume ID in the physical volume-pool volume table 62 stored in the memory 133 (SP51).

The CPU 130 then associates the above-recorded new physical volume ID with a specified pool volume ID (SP52), and then executes the pool volume ID acquisition processing in accordance with the program stored in the memory 133 so that an additional capacity is allocated to the relevant pool volume(s) (SP53). Details of the pool volume ID acquisition processing have been described before, so the same explanation will be omitted here.

When an additional capacity is allocated to the relevant pool volume(s) PLVOL/SLVOL, the CPU 130 ends the pool volume addition processing (SP54).

(5) Effect of this embodiment

As described above, in the storage system 1, if a primary pool volume PLVOL runs short of capacity, an internally or externally connected storage apparatus 4 can anticipate the occurrence of a capacity shortage in any corresponding secondary pool volume SLVOL, and accordingly expand the capacity of all the related secondary pool volumes SLVOL together with the capacity expansion of the primary pool volume PLVOL.

As a result, according to this storage system 1, upon the copy function being executed, it is possible to prevent a data copying failure from occurring due to a capacity shortage in the secondary pool volume SLVOL, resulting in a highly reliable storage system.

(6) Other embodiments

The above embodiment is explained assuming data stored in a primary logical volume established in a storage apparatus as being replicated in a secondary logical volume established in the same storage apparatus via the local copy function.

However, the present invention can also be applied where data stored in a primary logical volume established in a storage apparatus is replicated in a secondary logical volume established in another storage apparatus at a remote location via the remote copy function.

Also, in the above-explained embodiment, the disk devices 10 are used as storage devices providing a storage area to a primary pool volume PLVOL (a first pool volume) and a secondary pool volume SLVOL (a second pool volume). However, the present invention is not limited to this, and a broad range of various other storage devices, such as semiconductor memory devices, may be used.

Figure 2:
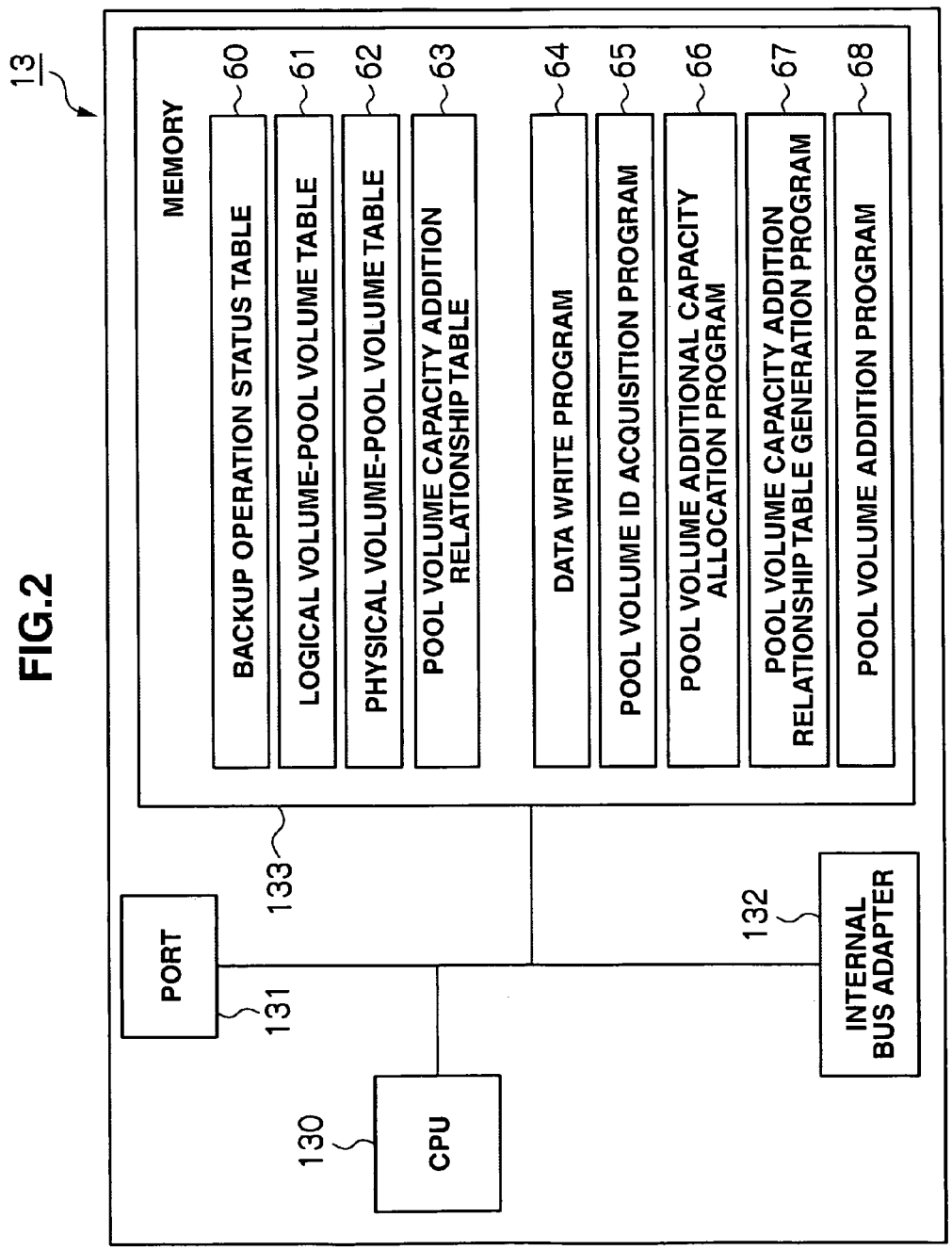
FIG. 2 is a block diagram showing a channel adapter according to an embodiment of the invention.

Moreover, in the above-explained embodiment, the single CPU 130 (FIG. 2) includes: a first primary allocation unit for managing a portion of the storage area provided by the disk devices 10 as a primary pool volume PLVOL, and allocating a dynamically variable storage area to a primary logical volume PVOL from within the storage area managed as that primary pool volume PLVOL; a first secondary allocation unit for managing a portion of the storage area provided by the disk devices 10 as a secondary pool volume SLVOL, and allocating a dynamically variable storage area to a secondary logical volume SVOL from within the storage area managed as that secondary pool volume SLVOL; a second primary allocation unit for allocating, in accordance with the status of storage area allocation to the primary logical volume PVOL from within the storage area managed as the primary pool volume PLVOL, a dynamically variable storage area to the primary pool volume PLVOL from within the storage area provided by the disk devices 10; a second secondary allocation unit for allocating, together with the allocation of a storage area to the primary pool volume PLVOL by the second primary allocation unit, a storage area to the secondary pool volume SLVOL from within the storage area provided by the disk devices 10; and a managing unit for managing the storage area allocation status for the primary pool volume PLVOL and secondary pool volume SLVOL. However, the present invention is not limited to this, and the first primary allocation unit, first secondary allocation unit, second primary allocation unit, second secondary allocation unit and management unit can be each constructed from separate hardware devices.

The present invention can be widely applied to storage systems provided with one or more storage apparatuses, and various other storage systems.

What is claimed is:

1. A storage system that stores multiple copies of data by storing data written by a host apparatus to one or more primary logical volumes, both in the primary logical volumes and in one or more secondary logical volumes paired with the primary logical volumes, the storage system comprising:

a first primary allocation unit for managing one or more first pool volumes, each being constituted from a portion of a storage area provided by corresponding storage devices and associated with one or more of the primary logical volumes, and allocating a dynamically variable storage area to the primary logical volumes from within the storage area managed as the associated first pool volume;

a first secondary allocation unit for managing one or more second pool volumes, each being constituted from a portion of a storage area provided by corresponding storage devices and associated with one or more of the secondary logical volumes, and allocating a dynamically variable storage area to the secondary logical volumes from within the storage area managed as the associated second pool volume;

a second primary allocation unit for allocating, in accordance with the status of storage area allocation to the primary logical volumes from within the storage area managed as the associated first pool volume, a dynamically variable storage area to the first pool volumes from within the storage area provided by the corresponding storage devices; and a second secondary allocation unit for allocating, together with the storage area allocation to the first pool volumes by the second primary allocation unit, a storage area to the second pool volumes from within the storage area provided by the corresponding storage devices, wherein the second primary allocation unit, if it has found all storage areas in the first pool volumes to be storage areas allocated from within the storage area provided by the storage devices, allocates, from within the unallocated storage area provided by the storage devices, a storage area to one or more first pool volumes, from among the first pool volumes, to which a storage area needs to be allocated, and wherein, together with the storage area allocation to the first pool volumes by the second primary allocation unit, the second secondary allocation unit allocates, from within the unallocated storage area provided by the corresponding storage devices, a storage area to one or more second pool volumes, from among the second pool volumes, that are directly associated with the first pool volumes.

2. The storage system according to claim 1, wherein, together with the storage area allocation to the first pool volumes by the second primary allocation unit, the second secondary allocation unit allocates, from within the unallocated storage area provided by the corresponding storage devices, a storage area to any second pool volume, from among the second pool volumes, that is related to the first pool volumes via the one or more second pool volumes directly associated with the first pool volumes.

3. A storage system that stores multiple copies of data by storing data written by a host apparatus to one or more primary logical volumes, both in the primary logical volumes and in one or more secondary logical volumes paired with the primary logical volumes, the storage system comprising:

a first primary allocation unit for managing one or more first pool volumes, each being constituted from a portion of a storage area provided by corresponding storage devices and associated with one or more of the primary logical volumes, and allocating a dynamically variable storage area to the primary logical volumes from within the storage area managed as the associated first pool volume;

a first secondary allocation unit for managing one or more second pool volumes, each being constituted from a portion of a storage area provided by corresponding storage devices and associated with one or more of the secondary logical volumes, and allocating a dynamically variable storage area to the secondary logical volumes from within the storage area managed as the associated second pool volume;

a second primary allocation unit for allocating, in accordance with the status of storage area allocation to the primary logical volumes from within the storage area managed as the associated first pool volume, a dynamically variable storage area to the first pool volumes from within the storage area provided by the corresponding storage devices;

a second secondary allocation unit for allocating, together with the storage area allocation to the first pool volumes by the second primary allocation unit, a storage area to the second pool volumes from within the storage area provided by the corresponding storage devices; and a management unit for managing the storage area allocation status for the first pool volumes and second pool volumes, wherein the management unit searches for a first pool volume and its corresponding second pool volume from among the first and second pool volumes, and if the first pool volume and the corresponding second pool volume are detected, the management unit increments the pre-managed number of times of allocation to be performed for the detected second pool volume.

4. A data storage method for storing multiple copies of data by storing data written by a host apparatus to one or more primary logical volumes, both in the logical volumes and in one or more secondary logical volumes paired with the primary logical volumes, the method comprising:

a first step of managing one or more first pool volumes, each being constituted from a portion of a storage area provided by corresponding storage devices and associated with one or more of the primary logical volumes, and allocating a dynamically variable storage area to the primary logical volumes from within the storage area managed as the associated first pool volume, and also managing one or more second pool volumes, each being constituted from a portion of a storage area provided by corresponding storage devices and associated with one or more of the secondary logical volumes, and allocating a dynamically variable storage area to the secondary logical volumes from within the storage area managed as the associated second pool volume; and a second step of allocating, in accordance with the status of storage area allocation to the primary logical volumes from within the storage area managed as the associated first pool volume, a dynamically variable storage area to the first pool volumes from within the storage area provided by the corresponding storage devices, and also allocating, together with the storage area allocation to the first pool volumes, a storage area to the second pool volumes from within the storage area provided by the corresponding storage devices, wherein the second step includes:

if all storage areas in the first pool volumes have been found to be storage areas allocated from within the storage area provided by the storage devices, allocating, from within the unallocated storage area provided by the storage devices, a storage area to one or more first pool volumes, from among the first pool volumes, to which a storage area needs to be allocated, and together with the storage area allocation to the first pool volumes, allocating from within the unallocated storage area provided by the corresponding storage devices, a storage area to one or more second pool volumes, from among the second pool volumes, that are directly associated with the first pool volumes.

5. The data storage method according to claim 4, wherein the second step includes:

together with the storage area allocation to the first pool volumes, allocating, from within the unallocated storage area provided by the corresponding storage devices, a storage area to any second pool volume, from among the second pool volumes, that is related to the first pool volumes via the one or more second pool volumes directly associated with the first pool volumes.

6. A data storage method for storing multiple copies of data by storing data written by a host apparatus to one or more primary logical volumes, both in the logical volumes and in one or more secondary logical volumes paired with the primary logical volumes, the method comprising:

a first step of managing one or more first pool volumes, each being constituted from a portion of a storage area provided by corresponding storage devices and associated with one or more of the primary logical volumes, and allocating a dynamically variable storage area to the primary logical volumes from within the storage area managed as the associated first pool volume, and also managing one or more second pool volumes, each being constituted from a portion of a storage area provided by corresponding storage devices and associated with one or more of the secondary logical volumes, and allocating a dynamically variable storage area to the secondary logical volumes from within the storage area managed as the associated second pool volume;

a second step of allocating, in accordance with the status of storage area allocation to the primary logical volumes from within the storage area managed as the associated first pool volume, a dynamically variable storage area to the first cool volumes from within the storage area provided by the corresponding storage devices, and also allocating, together with the storage area allocation to the first pool volumes, a storage area to the second pool volumes from within the storage area provided by the corresponding storage devices; and a third step of managing the storage area allocation status for the first pool volumes and second pool volumes, the third step including searching for a first pool volume and its corresponding second pool volume from among the first and second pool volumes, and if the first pool volume and the corresponding second pool volume are detected, incrementing the pre-managed number of times of allocation to be performed for the detected second pool volume.

* * * * *